United States Patent [19]

Sartorio

[11] Patent Number: 5,274,213
[45] Date of Patent: Dec. 28, 1993

[54] ELECTRIC WELDING ROBOT AND A METHOD FOR WELDING BY USING THE ROBOT

[75] Inventor: Franco Sartorio, Turin, Italy
[73] Assignee: Amada Company, Limited, Japan
[21] Appl. No.: 743,298
[22] PCT Filed: Dec. 19, 1990
[86] PCT No.: PCT/JP90/01655
§ 371 Date: Aug. 15, 1991
§ 102(e) Date: Aug. 15, 1991
[87] PCT Pub. No.: WO91/08856
PCT Pub. Date: Jun. 27, 1991

[30] Foreign Application Priority Data

Dec. 20, 1989 [IT] Italy .............................. 68133 A/89

[51] Int. Cl.⁵ .............................................. B23K 9/12
[52] U.S. Cl. .......................... 219/125.1; 219/124.34; 901/15; 901/42
[58] Field of Search ..................... 219/125.1, 124.34; 901/15, 42

[56] References Cited

U.S. PATENT DOCUMENTS

| | | | |
|---|---|---|---|
| 3,031,566 | 4/1962 | Wuesthoff | 219/125.1 |
| 4,014,495 | 3/1977 | Oda et al. | 219/125.1 |
| 4,179,602 | 12/1979 | Maruyama et al. | |
| 4,323,758 | 4/1982 | Vokurka | 219/125.1 |
| 4,594,670 | 6/1986 | Itoh | 901/15 |
| 4,629,860 | 12/1986 | Lindbom | 219/125.1 |
| 4,642,752 | 2/1987 | Debarbieri et al. | 901/42 |
| 4,675,502 | 6/1987 | Haefner et al. | 219/124.34 |
| 5,015,821 | 5/1991 | Sartorio et al. | 219/124.34 |

FOREIGN PATENT DOCUMENTS

| | | |
|---|---|---|
| 0078522 | 5/1983 | European Pat. Off. . |
| 0169473 | 1/1986 | European Pat. Off. . |
| 0180565 | 5/1986 | European Pat. Off. . |
| 2627114 | 2/1989 | France . |
| 67106 | 2/1988 | Italy . |

*Primary Examiner*—Clifford C. Shaw
*Attorney, Agent, or Firm*—Wigman, Cohen, Leitner & Myers

[57] ABSTRACT

An electric welding robot (1) is disclosed. The robot comprises a projecting arm (9) movable horizontally and vertically (X, Z) and a first and a second rotating arms (19, 22) rotatable about vertical axis (E, F). The arms (9, 19, 22) are articulated with one another, and the second rotating arm (22) carries a welding electrode (29). The movement of the arms (9, 19, 22) are controlled by means (5, 8, 20, 23) to position the electrode (29) at desired positions and in desired directions for carrying out welding easily in any direction. The said means include second means (23) for rotating the second arm (22) forcibly about the axis (F) when necessary and automatically and mechanically clockwise about the axis (F) through an equal angle ($\alpha$) when the first arm (19) is rotated forcibly by the first means (20) anticlockwise about the axis (E) through an angle ($\alpha$).

9 Claims, 4 Drawing Sheets

ELECTRIC WELDING ROBOT AND A METHOD FOR WELDING BY USING THE ROBOT

DESCRIPTION

1. Technical Field

The present invention relates to an electric welding robot comprising a plurality of arms articulated with one another and to a method for welding by using the welding robot.

2. Background Art

In the prior art known is a welding robot, which has a plurality of rotating arms articulated with one another to move its welding electrode horizontally and vertically.

For the welding robot of the prior art, positioning of the electrode at desired locations is controlled by rotating or moving the said arms independently by respective motors.

However, it is difficult to control the said arms at the same time for welding in a particular direction, and therefore it requires special controlling means and costs much.

DISCLOSURE OF INVENTION

It is therefore the primary object of the present invention to provide an electric welding robot which carries out welding easily in any direction.

It is also an object of the present invention to provide a method for carrying out welding easily in any direction.

The electric welding robot of the present invention comprises a projecting arm mounted on a support to move vertically and horizontally; a first rotating arm articulated with the projecting arm; a second rotating arm articulated with the first rotating arm; a head having a welding electrode, being connected to its supporting elements one of which is fixed to the second rotating arm; first means for rotating the first rotating arm about a first vertical axis with reference to the projecting arm, and second means for rotating the second rotating arm about a second vertical axis with reference to the first rotating arm, the said supporting elements positioning the top end of the welding electrode on the said second vertical axis.

Particularly, the second means for rotating the second rotating arm includes a motor fixed not to rotate about the first vertical axis and transmission means both of which cause a mechanically and automatically synchronous rotation of the second rotating arm about the second vertical axis through an equal angle in the opposite direction when the first rotating arm is rotated forcibly by the said first means about the first vertical axis through an angle in a direction.

The method of the present invention for welding by using this welding robot comprises steps of rotating the second rotating arm with reference to the first rotating arm through a desired angle when necessary so that the second arm faces in a desired direction, and rotating of the first arm about the first vertical axis through an angle in a direction with a mechanically and automatically synchronous rotation of the second arm about the second vertical axis through an equal angle in the opposite direction effected by the said rotation of the first arm.

BEST MODE FOR CARRYING OUT THE INVENTION

The invention will now be described in detail with reference to the attached drawings.

Figure 1:
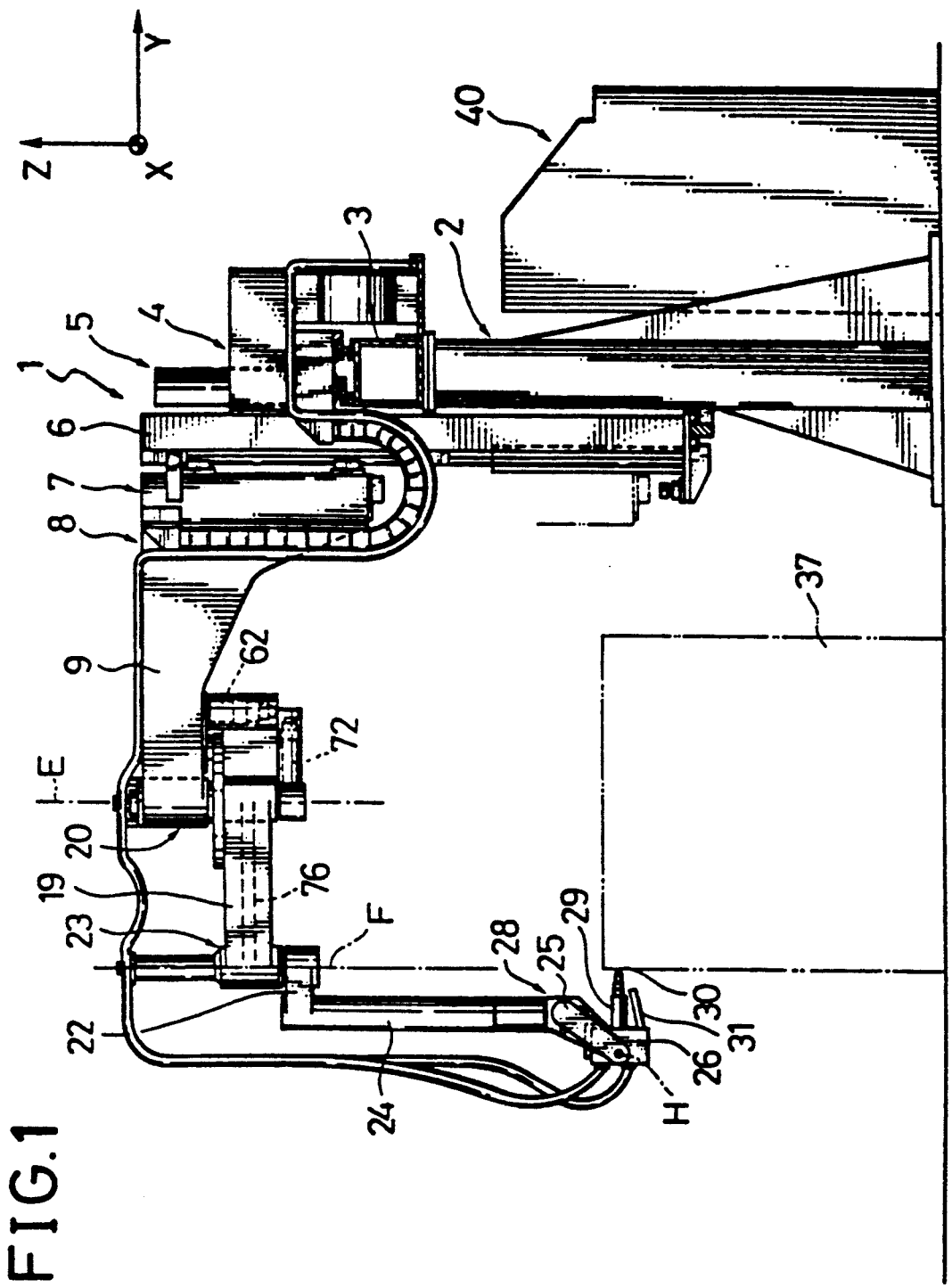
FIG. 1 is a side view of an electric welding robot according to the present invention.
Figure 2:
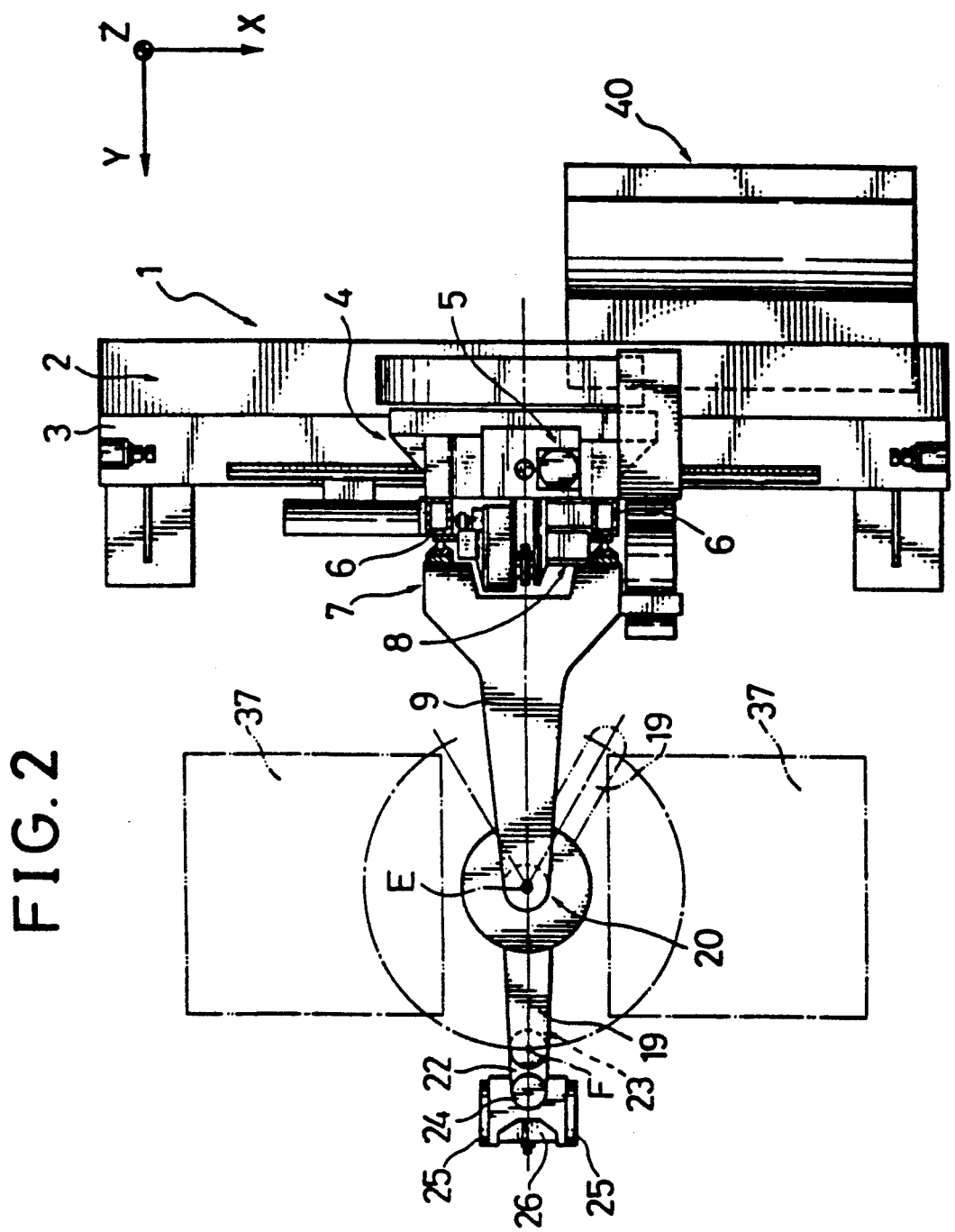
FIG. 2 is a top plan view of the electric welding robot shown in FIG. 1.

In FIGS. 1 and 2, there is shown a welding robot 1 according to the present invention. The welding robot 1 includes an electronic control unit 40 and a support 2. The support 2 carries at its top a rectilinear guide beam 3 disposed parallel to the X axis. A slide 4 is mounted slidably on the guide beam 3. The slide 4 is driven by a driving unit 5 of known type. The slide 4 fixedly carries a pair of vertical guides 6 parallel to the Z axis, along which slides a second slide 7 by means of another driving unit 8 also of known type.

Figure 3:
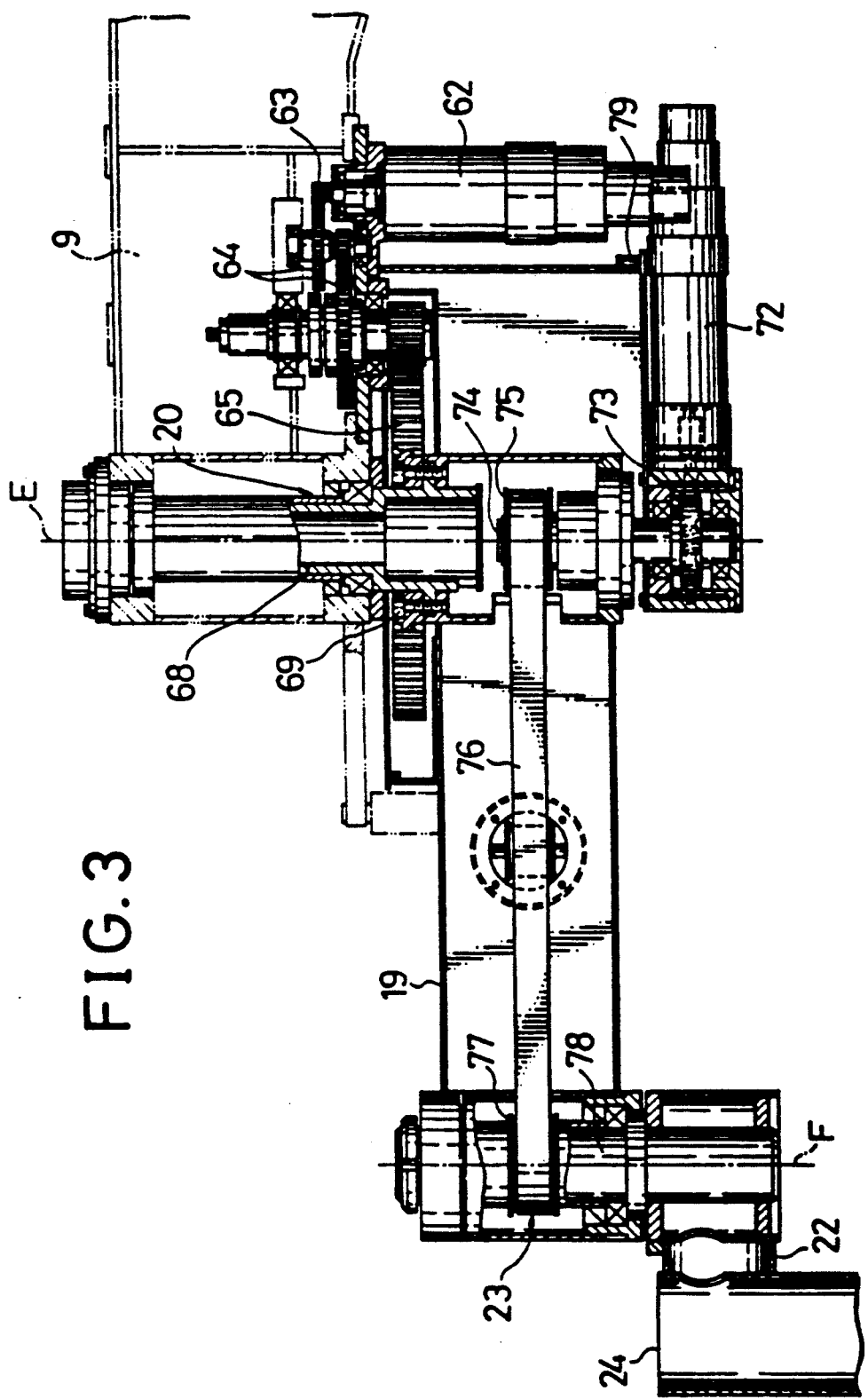
FIG. 3 is a partially sectional side view showing means for rotating two rotating arms of the welding robot.

In FIGS. 1–3, the slide 7 is provided with a projecting arm 9. A first rotating arm 19 is pivoted at its one end by means of a shaft 68 with an end of the projecting arm 9. The first rotating arm 19 is rotated about a first vertical axis E of the shaft 68 by first means 20 including a motor 62 supported by the projecting arm 9, a gear 63 of the motor 62, a plurality of transmission gears 64, and a gear 65 of the shaft 68. The gear 65 is fixed to the shaft 68 which is rotatably supported in the arm 9. The gear 65 is also fixed to the arm 19 with connecting members 69.

A second rotating arm 22, which is short, is pivoted at its one end by means of a shaft 78 with another end of the first rotating arm 19. The shaft 78 is rotatably supported in the first arm 19. There is another shaft 74 disposed in the first arm 19. The axis of the shaft 74 is matched with the first vertical axis E of the shaft 68 which connects these two arms 9, 19 with each other through the gear 65. The shaft 74 is supported and rotatable freely in the first arm 19 and is provided with a toothed pulley 75 fixed to it at its one end and at the other end connected to a motor 72 through worm gears 73. The motor 72 is fixed to the projecting arm 9 with connecting means 79 to prevent its rotation about the first vertical axis E. The shaft 78 is also provided with a toothed pulley 77 fixed to it. A toothed belt 76 is disposed between two pulleys 77 and 75 to transmit the rotation of the motor 72 when it is driven. One end of the second rotating arm 22 is fixed to the bottom part of the shaft 78, and therefore the arm 22 can be rotated about an axis F with reference to the first arm 19 by second means 23 comprising the motor 72, worm gears 73, shafts 74, 78, the toothed belt 76 and the toothed pulleys 75, 77.

Figure 4A:
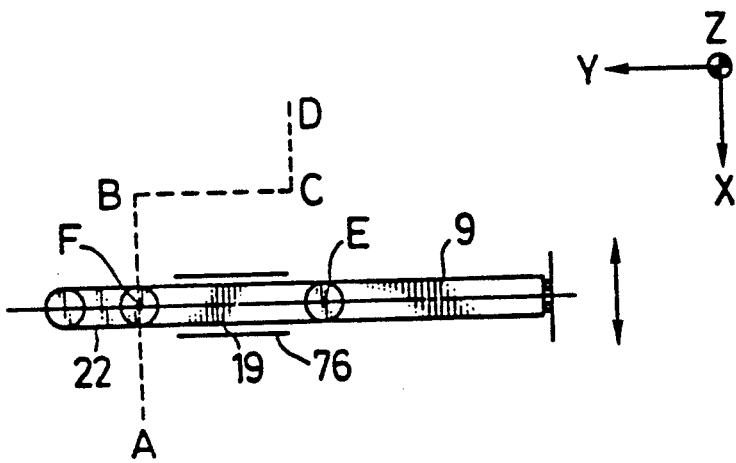
FIGS. 4(a)–4(e) are explanatory drawings to show movements of three arms of the welding robot.
Figure 4B:
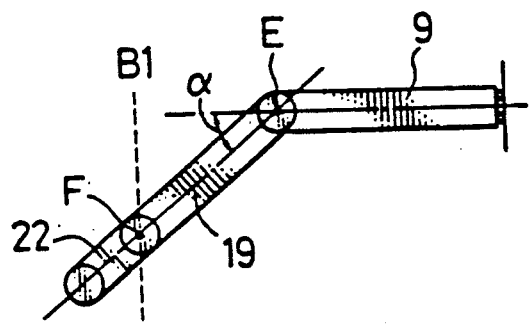
Figure 4C:
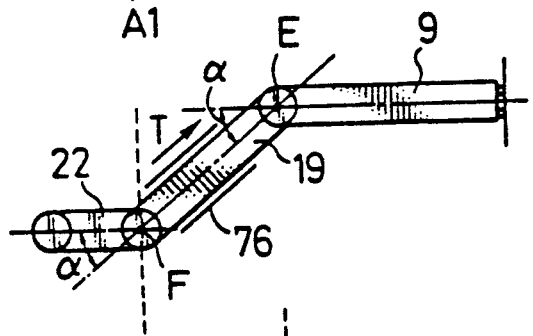

As it will be described later in detail, the second rotating arm 22 is rotated about the second vertical axis F in the opposite direction (clockwise) mechanically and automatically by a synchronized function of the second means 23 when the first rotating arm 19 is rotated forcibly by the first means 20 about the first vertical axis E in a direction (anti-clockwise) as shown in FIG. 4c, if the motor 72 of the second means 23 is deactivated and also fixed not to rotate about the first vertical axis E and therefore the shaft 74 is fixed there without rotating notwithstanding the rotation of the first rotating arm 19.

At the other end the second rotating arm 22 fixedly carries a columnar arm 24 which extends from the said end downwards parallel to the Z axis (FIG. 1). At the lower end of the arm 24 connected is a fork 25 which carries a head 26 on an axis H which is perpendicular to the axis F. The head 26 can be rotated about the axis H, by means of an angular position driving unit 28. The head 26 carries a rectilinear welding electrode 29 which extends from the head 26 and terminates with an end 30 which is exactly on the projection line of the axis F when the electrode 29 is disposed perpendicularly to the axis F itself.

The head 26 is further provided with a laser vision sensor 31 which can turn about electrode 29, and which is orientated with its field of vision in a region close to the top end 30 of the electrode 29, conveniently as described in Italian Patent Application No. 67106-A/88 filed Feb. 15, 1988 and the contents of which are incorporated herein by reference.

With reference to FIG. 4, a method of present invention for welding is described now in detail.

FIG. 4a is a simplified plan of the welding robot of FIGS. 1 and 2. Three arms 9, 19, 22 are now aligned in a line. The top end 30 of the electrode 29 is just on the projection line of the axis F (FIG. 1), and the electrode 29 extends perpendicularly to a dotted line A–B. When a welding is necessary for an object 37 along the dotted line A–B it is easily carried out by moving the projecting arm 9 horizontally along the guide beam 3.

If the welding line A–B lies on a line A1–B1 as shown in FIG. 4b, it is difficult to carry out the welding by a conventional welding robot, because rotations and/or movements for all arms must be controlled. However, it is carried out easily by the robot of the present invention. For example, in the first place, the first rotating arm 19 is rotated anti-clockwise about the first vertical axis E through an angle of α. At this time, the second rotating arm 22 would move together with the first arm 19 as shown in FIG. 4b if the welding robot 1 is not provided with the second means 23, or the motor 72 is allowed to rotate about the first vertical axis E. When the shaft 74 is locked in the first arm 19 by deactivating the motor 72 which is fixed to the projecting arm 9 with fixing members 79 not to rotate about the first vertical axis E and when the first arm 19 is rotated forcibly by the first means 20 about the first vertical axis E through an angle of α anti-clockwise, tensile force T caused on the transmission belt 76 automatically rotates the pulley 78 and therefore the second arm 22 about the second vertical axis F through an equal angle of α clockwise, which is synchronized with the said rotation of the first arm 19 as shown in FIG. 4c, if the two pulleys 75, 77 are equal to each other in diameter.

Then, the projecting arm 9 is moved horizontally by a distance d, and the welding is initiated with rotating of the first arm 19 and/or moving of the projecting arm 9.

Figure 4D:
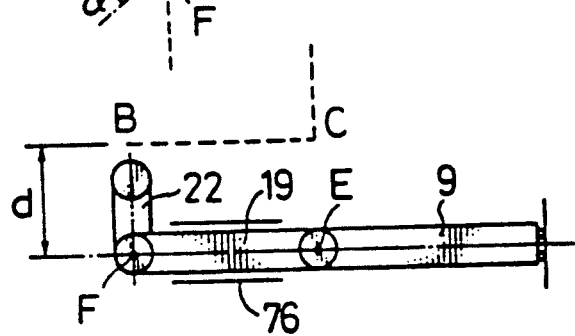
Figure 4E:
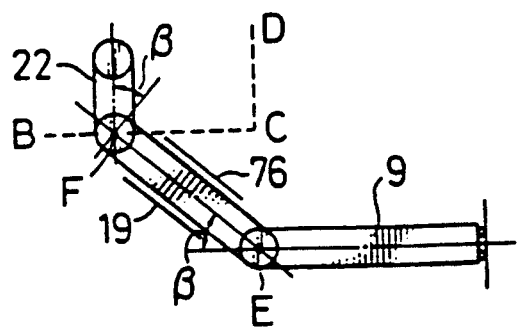

When a welding is necessary along a line B–C shown in FIG. 4d, the second arm 22 is rotated through a desired angle by activating the motor 72 so that the electrode 29 faces in a direction perpendicular to the line B–C, and the first arm 19 is rotated through a desired angle of β (FIG. 4e) by the first means 20. At this time, the second arm 22 is held automatically with the electrode 29 facing in the same direction perpendicular to the welding line B–C.

Industrial Applicability

Welding is carried out easily in any direction by using the welding robot and the welding method of the present invention.

I claim:

1. A method for welding by using a welding robot which includes: a projecting arm, a first rotating arm rotatably mounted on said projecting arm about a first axis, a second rotating arm rotatably mounted on said first rotating arm about a second axis parallel to said first axis, a welding head mounted on a free end of said second rotating arm, a first pulley mounted on said projecting arm and substantially centered on said first axis, a second pulley fixed to said second rotating arm and substantially centered on said second axis, a diameter of said second pulley being substantially equal to that of said first pulley, and a transmission belt extending between said first pulley and said second pulley;
said method comprising the steps of;
stopping said first pulley with respect to said projecting arm,
rotating said first rotating arm with respect to said projecting arm such that said second rotating arm undergoes an equal angular counterrotation to the rotation of said first rotating arm, and
effecting a welding by using said welding head.

2. A welding robot comprising:
a projecting arm;
a first rotating arm rotatably mounted on said projecting arm about a first axis;
a first driving means for rotating said first rotating arm (19) with respect to said projecting arm;
a second rotating arm rotatably mounted on said first rotating arm about a second axis parallel to said first axis;
a welding head mounted on a free end of said second rotating arm,
a first pulley mounted on said projecting arm and substantially centered on said first axis;
a second driving means for rotating said first pulley with respect to said projecting arm;
a second pulley fixed to said second rotating arm and substantially centered on said second axis, a diameter of said second pulley being substantially equal to that of said first pulley;
a transmission belt extending between said first pulley and said second pulley; and
a control means for deactivating said second driving means to stop said first pulley with respect to said projecting arm and said first driving means to rotate said first rotating arm with respect to said projecting arm such that said second rotating arm undergoes an equal angular counterrotation to the rotation of said first rotating arm.

3. A welding robot according to claim 2, further comprising:
a motor secured to said projecting arm;
a worm gear connected to an output shaft of said motor;
a first shaft centered on said first axis, connected to said worm gear, and fixed to said first pulley;
a second shaft centered on said second axis, fixed to said second pulley, and secured to said second arm.

4. A welding robot according to claim 2, further comprising:

a support provided with said projecting arm, said projecting arm being slidable with respect to said support in a direction perpendicular to said first axis;

a supporting element fixed to an end of said second rotating arm;

a head fixed to an end of said supporting element;

a welding electrode mounted on said head, a top end of said welding electrode positioned on said second axis; and a means for rotating said first rotating arm with reference to said projecting arm.

5. A welding robot according to claim 4, wherein said pulleys and belt are toothed.

6. A welding robot according to claim 2, wherein said second rotating arm is short in length and is fixed rigidly to a columnar arm.

7. A welding robot according to claim 2, wherein said head is rotatable about a third axis perpendicular to said second axis.

8. A welding robot according to claim 2, further comprising a laser vision sensor near said electrode, said laser vision sensor being oriented with its field of view in a region close to said end of said electrode.

9. A welding robot according to claim 2, wherein said first driving means includes a motor, said second driving means includes a motor, and said control means includes a control unit.

* * * * *